United States Patent Office 3,795,659
Patented Mar. 5, 1974

3,795,659
CURING OF EPOXIDE COMPOSITIONS
CONTAINING ENAMINES
Gordon M. Renwick, Sydney, New South Wales, Australia, assignor to Minnesota Mining and Manufacturing Company
No Drawing. Filed Sept. 8, 1972, Ser. No. 287,243
Int. Cl. C08g 30/14
U.S. Cl. 260—47 EN                5 Claims

ABSTRACT OF THE DISCLOSURE

An anhydrous, curable epoxide composition containing an enamine as a latent curing agent.

---

This invention relates to epoxide compositions which can be cured by exposure to moisture, by heating or by a combination of both ways.

Epoxide compositions can be cured by curing agents to form hard products having a good chemical resistance. Because of this desirable property, the resulting cured epoxide compositions have many potential applications.

The application of epoxide compositions is limited, however, by the fact that, once the epoxide and curing agent have been mixed, they cure very rapidly. Therefore, anyone using these substances has to ensure that no delay occurs between mixing the components and curing them in a mold since increased viscosity occurs within only a few hours of mixing. Delays, of course, are often inevitable and if these occur, large quantities of the mixed composition can be wasted.

Various attempts have been made to avoid this disadvantage. One approach has been to provide a premixed composition which can be cured only when activated by moisture and thus the composition can be stored ready for use, while another approach has been to use mixtures of the polyepoxide and a curing agent precursor which will liberate the curing agent upon heating.

One composition uses as a latent curing agent for the epoxide composition an imine which is activated by moisture. This composition can therefore be stored in a moisture-free environment, and cured simply by exposing it to moist air. Imines are not, however, very stable and therefore their use rather defeats the primary object of providing a stable premixed composition. Furthermore, imines also tend to be susceptible to self-condensation reactions and to the formation of polymerization products.

The invention has therefore been made with these points in mind.

According to the invention there is provided a substantially anhydrous composition which includes a curable epoxide having at least two 1,2-epoxide groups and, as a latent curing agent, an enamine.

The enamine latent curing agent does not promote the curing of the epoxide mixture until activated by moisture when it rapidly cures the mixture.

The composition according to the invention remains substantially uncured for relatively long periods, e.g., six weeks, and so the composition can be made up in advance and then stored ready for use.

The product resulting from curing the composition of the invention has very desirable properties including a high chemical stability as shown by its infusible and insoluble nature.

Enamines are slowly hydrolyzed by water to the parent carbonyl compound and an amine. The amine then takes part in condensation with the epoxide precursor. An example of one reaction illustrating this conversion is a follows, in which the starting material is the bis-enamine N,N'-dimethyl-N,N'-di(1-cyclohexenyl)hexamethylenediamine:

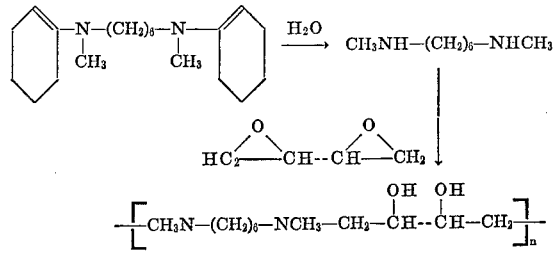

A diamine is thus formed by the action of water on the bis-enamine and the subsequent incorporation of the diamine into the product allows one to modify the resin properties as desired by an appropriate choice of the initial enamine.

The curing or polymerization of the epoxide has the additional advantage of being essentially linear with very little three-dimensional cross-linking. This has the effect that the increase in viscosity is gradual and can therefore be effectively controlled.

The compositions according to the invention have utility as one step adhesives or potting compositions which can be cured on exposure to moist air. They can also be used as coating compositions.

The compositions of the invention cure more rapidly at elevated temperatures once they have been exposed to moisture.

Mono-functional enamines can be used as curing agents according to the invention as also can poly-functional polymeric enamines.

Bis-enamines can be prepared by methods generally known in the art. For example, bis-secondary amines can be reacted with ketones.

Enamines can also be prepared by reacting aldehydes or ketones with cyclic secondary amines such as piperidine and pyrrolidine in the presence of, for example, a trace of p-toluene-sulphonic acid as catalyst.

Preferably the enamine is completely miscible with the epoxide.

Also the enamines are preferably of relatively high viscosity.

Miscible enamines having relatively high viscosities can, for example, be prepared by reacting an ether of bis-phenol A, e.g., diglycidyl ether of bis-phenol A, with an excess of a primary amine to give a diamine, and then converting the diamine to a bis-enamine by, for example, reaction with cyclohexanone.

It has been found that enamines give a linear condensation product when used as a curing agent with epoxides, unlike some other curing agents which can give three dimensional condensation, i.e., cross-linking.

The enamines can contain in their structure stabilizing groups bonded to the carbon atom in the beta position relative the nitrogen atom, e.g., phenyl groups, carboxylic ester groups, alcohol groups and carboxyl groups, which tend to make the enamines more stable upon exposure to moisture. Compositions according to the invention containing such stabilized enamines tend to have improved shelf life and, although they may cure the compositions more slowly once exposed to moisture, this disadvantage can be overcome if the compositions are cured at elevated temperatures.

According to the present experimental results, it is believed that any enamine (and presently most preferably bis-enamines) will work in the manner described in this generic invention for the use of enamines as curing agents for epoxides. When long chain groups, or large or multi-ring systems are present, the compounds may be even more stable, and so the rate of curing may be slower. Under certain circumstances this may be desirable.

Any epoxide (any compound containing at least one epoxy group) which is capable of being cured can be used in the compositions of the invention. Preferred epoxides are compounds which contain at least two epoxy groups (e.g., diepoxides). Polymeric materials with epoxy groups may also be used.

Besides being curable by moisture, the compositions of the invention can be cured by heating to relatively high temperatures, particularly if traces of moisture are present.

The invention will now be illustrated with reference to the following preparations of enamines and examples of compositions of the invention.

PREPARATION

These preparations illustrate how various enamines for use as the latent curing agents in the compositions of the invention can be prepared.

The general procedure was to dissolve an equivalent of a secondary amine in benzene (200 cc.) which was then added to an Erlenmeyer flask fitted with a reflux condenser arrangement which included a Dean-Stark trap and a dropping funnel. The stirred solution was brought to reflux temperature and a benzene solution (200 cc.) containing an equivalent amount of carbonyl compound having at least one alpha hydrogen atom was added dropwise through the dropping funnel over a period of fifteen minutes.

The mixture was allowed to react overnight at reflux temperature during which time an equivalent amount of water was collected in the Dean-Stark trap. The benzene was separated by distillation at atmospheric pressure. The residue was separated further by vacuum distillation and the desired product was collected as the center portion and major fraction as indicated in the following specific preparations.

(A) N-vinylpyrrolidine (1)

Acetaldehyde (75 g.) and pyrrolidine (15 g.) were refluxed in benzene (400 ml.) and water was removed by means of a Dean-Stark trap. When the theoretical amount of water had been collected the benzene was removed on a rotary evaporator and the product distilled at 100° C./0.3 mm. to give an almost colorless liquid. The yield was 65% of the theoretical expectancy.

Analysis (percent).—Found: C, 77.41; H, 10.39; N, 12.38. Calculated for $C_6H_{11}N$: C, 74.17; H, 11.41; N, 14.42.

(B) 1-(N-pyrrolidinyl) cyclohexene (2)

Following the procedure of preparation A, cyclohexanone (49 g.) and pyrrolidine (71 g.) were reacted. The product was distilled at 140° C./80 mm. and the amount collected represented 60% of theoretical expectancy.

(C) 1-(N-morpholino) cyclohexene (3)

This compound was prepared in the same way from cyclohexanone (24.5 g.) and morpholine (21.8 g.). The product was distilled at 85–89° C./2 mm. to give a colorless liquid. The yield was 50% of the theoretical expectancy.

(D) 1-diethylaminocyclohexene (4)

Diethylamine (120 g.), cyclohexanone (40 g.) and dried calcium chloride (30 g.) were stirred in dry ether (150 ml.) under a nitrogen atmosphere. After 112 hours, the slurry was filtered and volatile components removed on a rotary evaporator. Fractional distillation at 68° C./6 mm. yielded a product with the correct infrared spectrum (yield 45%).

(E) 1-(N-morpholino)-2-methylpropene (5)

This reaction was effected in the same way as in preparation A using isobutyraldehyde (56 ml.) and morpholine (43.6 ml.). The product distilled at 76–80° C./0.5 mm. and the yield was 70%.

(F) N,N'-dimethyl-N,N'-di(1-cyclohexenyl) hexamethylenediamine (7)

This compound was made following the procedure of preparation A using cyclohexanone (40 g.), N,N'-dimethylhexamethylenediamine (28.8 g.) and toluene-p-sulphonic acid (15 g.) in benzene (20 ml.). The product was fractionally distilled at 140° C./0.05 mm. to yield a colorless liquid (yield 60%).

Analysis (percent).—Found: C, 78.80; H, 11.7; N, 9.5. Calculated for $C_{20}H_{36}N_2$: C, 78.88; H, 11.92; N, 9.2.

(G) N,N'-dimethyl-N,N'-di(1-cyclohexenyl) ethylenediamine (6)

This compound was made following the procedure of preparation A from cyclohexanone (2.8 g.) and N,N'-dimethylethylenediamine (2.0 g.) in benzene (25 ml.). The yield was 60%.

(H) N,N'-di(1-cyclohexenyl) piperazine (8)

This compound was made following the procedure of preparation A from cyclohexanone (40 g.) and anhydrous piperazine (17.2 g.) in benzene (120 ml.). Reflux was continued for 20 hours. The solid product, after removal of volatile material, was sublimed at 110° C./0.2 mm. to yield a white solid of melting point 121° C. (yield 35%).

Analysis (percent).—Found: C, 77.6; H, 10.1; N, 11.7. Calculated for $C_{16}H_{26}N_2$: C, 78.0; H, 10.6; N, 11.4.

(I) β-(N-pyrrolidinyl) styrene (9)

This compound was made by following the procedure of preparation A from phenylacetaldehyde (30 g.) and pyrrolidine (18 g.) in benzene (150 ml.). The product was distilled at 175–185° C./15 mm., to yield an almost colorless liquid in a yield representing 50% of the theoretical expectancy.

(J) β-Methyl-β-(N-pyrrolidinyl) styrene (10)

Benzyl methyl ketone (26.8 g.) and pyrrolidine (21.2 g.) were stirred for 3 days in dry ether with dry $K_2CO_3$ (25 g.). The ether was removed under vacuum and the product distilled at 115–120° C./0.5 mm. (yield of product isolated 45%). The product solidified in a refrigerator.

(K) Ethyl-β-(N-pyrrolidinyl) crotonate (11)

The compound was made by following the procedure of preparation A from 43 g. ethyl acetoacetate and 23.7 g. pyrrolidine. The product was distilled at 116–122° C./0.5 mm. (yield 60% of the theoretical expectancy).

Analysis (percent).—Found: C, 66.9; H, 9.5; N, 7.9. Calculated for $C_{10}H_{17}NO_2$: C, 65.6; H, 9.4; N, 7.6.

(L) 4-hydroxy-4-methyl-2-(N-pyrrolidinyl) pent-2-ene (12)

This compound was made by following the procedure of preparation A from diacetone alcohol (46.4 g.) and pyrrolidine (28.4 g.). Slightly less than the theoretical amount of water was removed and the formation of the expected enamine was confirmed by infrared spectrum analysis after removal of excess pyrrolidine. The product was then used without further purification.

(M) 1-acetyl-2(N-pyrrolidinyl) propene (13)

Acetyl acetone (20.2 g.) and pyrrolidine (50.6 g.) were reacted in benzene following the procedure of preparation A. The solid product was recrystallized from benzene to give an almost colorless product with a melting point 117° C. in a yield of 30%. Although there were several possible products (tautomers, etc.), the IR, UV and NMR spectra were consistent with the acetyl enamine product.

Analysis (percent).—Found: C, 72.6; H, 9.2; N, 9.2. Calculated for $C_9H_{15}NO$: C, 70.6; H, 9.8; N, 9.1.

(N) N,N'-dimethyl-N,N'-di(β-styryl)hexamethylenediamine (14)

This compound was made following the procedure of preparation A from phenylacetaldehyde (8.6 g.) and N,N'-dimethylhexamethylenediamine (9.6 g.). The volatile residue, after removal of benzene, represented 100% of expected yield but this material was not purified further.

(O) N-(1-cyclohexenyl) polyethylenimine (15)

This compound was made following the procedure of preparation A from cyclohexanone (39.2 g.) and polyethyleneimine (17.2 g.) in benzene (100 ml.). Solvent and unreacted ketone were removed under vacuum to leave the product as an extremely viscous liquid which was used for evaluation without further purification. The yield of this product was approximately 100%.

(P) Polymer from N,N'-dimethylhexamethylenediamine and glutaraldehyde (16)

Anhydrous glutaraldehyde (33 g.) and N,N' - dimethylhexamethylene diamine (47.5 g.) were reacted in benzene (300 ml.) following the procedure of preparation A. The resulting semisolid polymer was used in benzene solution for incorporation in epoxide compositions. The yield was 100% of the theoretical.

(Q) Polymer from cyclohexadione and N,N'-dimethylhexamethylenediamine (17)

Cyclohexane-1,4-dione (22.4 g.) was reacted with N,N'-dimethylhexamethylenediamine (28.8 g.) in benzene (60 ml.) following the procedure of preparation A. The product was obtained as a dark colored extremely viscous material which was used for evaluation without further purification. The yield was 50%.

(R) Reaction of diepoxide with ethylamine and subsequent enamine formation (18)

Epikote 828 (75 g.) was added to ethylamine (125 ml.) in ethanol (100 ml.) plus benzene (50 ml.). The solution was heated on a steam bath for 30 seconds to initiate the reaction. The temperature remained at 48° C. for 45 minutes and the flask was stirred at room temperature for 18 hours. After removal of solvents and amine under vacuum, benzene (150 ml.) and cyclohexanone (50 g.) were added, and the enamine prepared by following the procedure of preparation A to yield a yellow viscous liquid. 1.40 g. of product were obtained.

(S) Reaction of diepoxide with n-butylamine and subsequent enamine formation (19)

Epikote 828 (12 g.) and n-butylamine (25 ml.) were refluxed in benzene (25 ml.) for 1½ hours. Cyclohexanone (26.7 g.) was added and the enamine prepared following the procedure of preparation A. Solvents and the imine formed from excess amine and the ketone were removed at 190° C./20 mm. and the viscous residue (45 g.) was used in further testing.

EXAMPLE 1

This example gives a comparison between various secondary amines and their corresponding enamine precursors when used as catalysts for polymerization of diepoxides. The liquid diepoxide was divided into two parts. An equivalent amount of secondary amine was added to the first and the corresponding equivalent of its enamine precursor was added to the second. The samples were mixed thoroughly, and aliquots were taken for coating onto a glass surface. The time required for these coatings to harden at 60° C. and 55% relative humidity (RH) were recorded as the cure time, and the time required for the viscosity of the unused portion remaining in stoppered vials kept at 20° C. to increase to a point where an air bubble failed to rise to the surface within 5 seconds after inversion of the vial were recorded as the shelf life. The results of these experiments are given in the following Table I.

TABLE I

| Compound (preparation No.) | Equivalent ratio of diepoxide to amine | Cure time (hours) at 60° C. | Cure time (hours) at 20° C; 55% RH | Storage time (hours) at 20° |
|---|---|---|---|---|
| ![structure] (N-H cyclohexyl amine) | 7:1 | 24 | 48 | 24 |
| ![structure] (N-CH=CH₂ cyclohexyl) (1) | 7:1 | 24 | 96 | 144 |
| $NH(C_2H_5)_2$ | 1:1 | 28 | 250 | 250 |
| $N(C_2H_5)_2$ with phenyl (4) | 1:1 | 24 | 250 | >500 |
| $CH_3NH—(CH_2)_6—NHCH_3$ | 1:1 | 2 | 15 | 24 |
| $CH_3N—(CH_2)_6—NCH_3$ with two phenyl groups (7) | 1:1 | 3 | 24 | >240 |

As shown in the above Table I the cure rates of the epoxide compositions by the enamines was extremely slow under dry storage. Furthermore, the cure rates of epoxides by enamines and amines had a similar order of magnitude in air. This illustrates the effectiveness of the compositions of the invention as premixed long life potting compositions.

EXAMPLE 2

This example illustrates the use of enamines as precursors which liberate secondary amines to catalyze polymerization of epoxides on exposure to atmospheric moisture.

The enamine in question was mixed thoroughly with a known amount of diglycidyl ether of bisphenol A (Epikote 816). A portion of this mixture was coated as a continuous film less than 2 mm. thick onto a glass surface which was exposed at 60° C. to the atmosphere whose relative humidity was approximately 55%. The time required to set to a hard film, as measured by resistance to scratching by a steel stylus, was measured and recorded as the cure time. The unused portion was stoppered in a glass container and stored at 20° C. The time required for the viscosity to increase to a point where an air bubble failed to rise to the surface within 5 seconds after inversion of the vial was recorded as the shelf life. The cure time and shelf life for each of the enamines tested and the respective epoxide to enamine ratios are shown in Tables II to V.

TABLE II

| Preparation No. | Enamine used Formula | Equivalent ratio of epoxide to enamine | Cure time (hours) | Shelf life (days) |
|---|---|---|---|---|
| 1 | CH$_2$=CH—N(pyrrolidine) | 1:1<br>20:1 | 24<br>24 | 4<br>6 |
| 2 | cyclopentyl–N(phenyl) enamine | 1:1<br>10:1 | 24<br>48 | 4<br>>5 |
| 3 | tetrahydropyranyl–N(phenyl) enamine | 4:1<br>10:1 | 72<br>96 | --------<br>-------- |
| 4 | N(C$_2$H$_5$)$_2$ phenyl | 1:1 | 96 | >28 |
| 5 | morpholinyl–CH=C(CH$_3$)$_2$ | 1:1 | 96 | -------- |
| 6 | H$_3$CN—(CH$_2$)$_2$—NCH$_3$ (diphenyl) | 1:1 | 120 | 7 |
| 7 | H$_3$CN—(CH$_2$)$_6$—NCH$_3$ (diphenyl) | 1:1 | 3 | 10 |
| 8 | cyclohexenyl–N–piperazine–N–cyclohexenyl | 1:1 | 120 | >14 |

TABLE III

| Preparation No. | Enamine used Formula | Equivalent ratio of epoxide to enamine | Cure time (hours) | Shelf life (days) |
|---|---|---|---|---|
| 9 | phenyl–CH=CH—N(pyrrolidine) | 1:1<br>3:1 | 24<br>36 | 14<br>21 |
| 10 | phenyl–CH=C(CH$_3$)—N(pyrrolidine) | 1:1<br>3:1 | 24<br>20 | --------<br>35 |
| 11 | CH$_3$—C(N-pyrrolidine)=CHCOOC$_2$H$_5$ | 2:1<br>7:1 | 240<br>240 | >120<br>>120 |

TABLE III—Continued

| Preparation No. | Enamine used Formula | Equivalent ratio of epoxide to enamine | Cure time (hours) | Shelf life (days) |
|---|---|---|---|---|
| 12 | $CH_3-C=CHC(OH)(CH_3)_2$ with N-piperidine on C | 1:1<br>5:1 | 48<br>48 | 3<br>3 |
| 13 | $CH_3-C=CHOCH_3$ with N-piperidine on C | 1:1<br>8:1 | 120<br>120 | 30<br>30 |
| 14 | $H_3CN(CH_2)_6NCH_3$<br>$\phi-HC=CH \quad CH=CH-\phi$ | 1:1<br>3:1 | 4<br>24 | 7<br>9 |

TABLE IV

| Preparation No. | Enamine used Formula | Equivalent ratio of epoxide to enamine | Cure time (hours) | Shelf life (days) |
|---|---|---|---|---|
| 15 | $[-N-CH_2-CH_2-]_n$ with phenyl on N | 1:1<br>10:1 | 12<br>168 | 1<br>14 |
| 16 | $[-N(CH_3)-CH=CH-CH_2-CH=CH-N(CH_3)-(CH_2)_6-]_n$ | 1:1<br>2:1 | 2<br>2 | 25<br>14 |
| 17 | $[-N(CH_3)-(CH_2)_6-N(CH_3)-\phi-]_n$ | 1:1<br>10:0 | 10<br>18 | 1<br>14 |

TABLE V

| Enamine used (preparation No.) | Equivalent ratio of epoxide to enamine | Cure time (hours) | Shelf life (days) |
|---|---|---|---|
| 18 | 1:1<br>1:2 | 7<br>7 | 90<br>97 |
| 19 | 1:1<br>1:2 | 5<br>4 | 37<br>37 |

EXAMPLE 3

One thousand parts of powdered Tylac 221–A, a 2 to 1 copolymer of carboxylated Buna-N-acid acrylonitrile, 146 parts of E.R.L. 2774, a Union Carbide bisphenol A epoxy resin of 180–195 E.E.W. which is a liquid, 354 parts of EPON 1001, a Shell bisphenol A epoxy resin of 425–550 E.E.W. which is a solid, 150 parts of C.K.R. 1634 which is a Union Carbide tertiary butyl phenolic, oil soluble, heat reactive resin, 234 parts of the bis-enamine prepared from N,N'-dimethylhexamethylene diamine and cyclohexanone, 3000 parts acetone and 1950 parts of dichloromethane were mixed and stirred together in the absence of moisture to give a homogenous solution.

Samples of the solution prepared above were used to laminate dissimilar materials such as, for example, canvas to wood. The procedure was as follows:

(A) A surface of wood was coated with the above solution and then a rubberized canvas was pressed onto the wood. This was allowed to set in place for twenty-four hours, after which an intimate bond had formed which could not be broken without tearing the canvas.

(B) The two opposing surfaces of two ceramic plates were coated with the solution prepared above and were pressed together and allowed to set at atmospheric conditions for twenty-four hours after which an unbreakable bond had formed.

(C) The corresponding samples were put together as in A and B and were placed in a chamber kept at 60° C. where the bond formation was completed within three hours.

As can be seen from all of the above examples, the compositions according to the invention remain stable for relatively long periods of time when stored under anhydrous conditions but will cure quite rapidly when exposed to moisture.

What is claimed is:

1. A composition comprising a curable epoxide having at least two 1,2-epoxide groups and as a latent curing agent an enamine, the composition being substantially anhydrous and being capable of curing in the presence of moisture.

2. A composition as claimed in claim 1 in which the enamine is a mono-enamine.

3. A composition as claimed in claim 1 in which the enamine is a bis-enamine.

4. A composition as claimed in claim 1 in which the enamine and epoxide are completely miscible.

5. A composition as claimed in claim 1 in which the epoxide is a diepoxide.

References Cited

UNITED STATES PATENTS 2,642,412   6/1953   Newey et al. _____ 260—2

WILLIAM H. SHORT, Primary Examiner

T. E. PERTILLA, Assistant Examiner

U.S. Cl. X.R.

106—39 R; 117—124 E, 148, 161 ZB; 161—184; 260—2 N